G. H. CARLTON.
TOASTER.
APPLICATION FILED MAR. 11, 1913.

1,178,298.

Patented Apr. 4, 1916.

WITNESSES
L. H. Schmidt
Myron L. Clear

INVENTOR
Guy H. Carlton,
BY Munn & Co.
ATTORNEYS

UNITED STATES PATENT OFFICE.

GUY H. CARLTON, OF MASON CITY, IOWA.

TOASTER.

1,178,298.     Specification of Letters Patent.     Patented Apr. 4, 1916.

Application filed March 11, 1913. Serial No. 753,496.

*To all whom it may concern:*

Be it known that I, GUY H. CARLTON, a citizen of the United States, and a resident of Mason City, in the county of Cerro Gordo and State of Iowa, have invented certain new and useful Improvements in Toasters, of which the following is a specification.

My present invention relates to toasters, and more particularly to that type of toasters which embody toasting plates having means whereby to support the same in superposed relation above a burner and the like and on which bread is disposed in order to toast the same, the object of my invention being to provide this type of toaster with means whereby the heat rising from the burner will be distributed over the entire lower surface of the toasting plate.

The means whereby the above object is carried out, are clearly shown in the accompanying drawing, in which—

Figure 1:
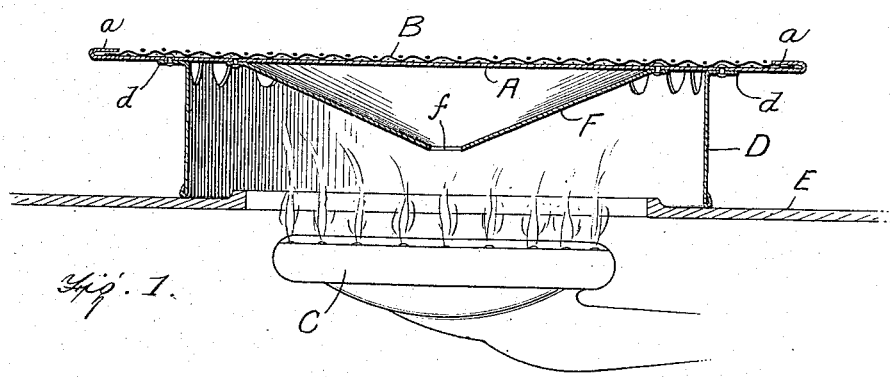
Figure 2:
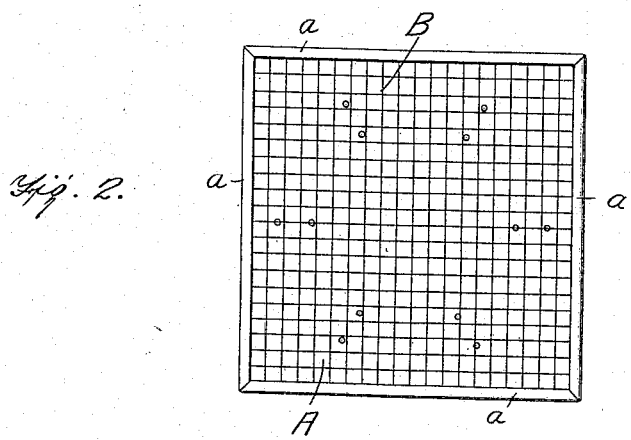
Figure 3:
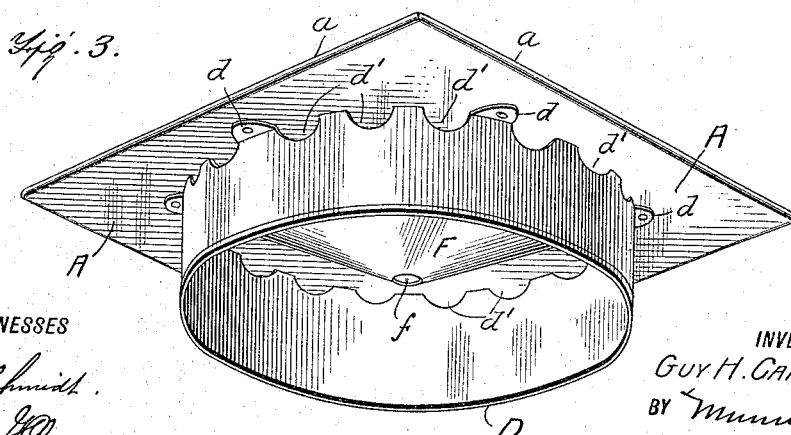

Figure 1 is a transverse vertical section illustrating my invention in its practical application. Fig. 2 is a top plan view of the toaster. Fig. 3 is a perspective view thereof.

Referring now to these figures, A indicates the horizontal toasting plate which is provided with upwardly curled edges $a$, bent downwardly upon the upper face of the plate in order to receive and retain the edges of the wire cloth B which forms an immediate support for the bread to be toasted in order that it may be prevented from actual contact with the toasting plate.

The toasting plate A is supported in superposed relation above a burner such as indicated at C in Fig. 1 by means of the annular flange D, the upper edge of which is provided with lugs $d$ riveted to the under surface of the toasting plate and the lower edge of which is adapted to rest upon the stove E or other support adjacent to the burner.

In order that the heat rising from the burner C may be distributed over the entire lower surface of the toasting plate, I provide a conical distributing plate F, the enlarged end of which has its surrounding edge riveted to the lower surface of the toasting plate and the downwardly disposed apex of which is provided with an aperture $f$. Thus a certain proportion of the heated air and products from the burner C finds it way through the aperture $f$ and to the central portion of the toasting plate, the remainder of such heat being deflected outwardly by the conical plate F to the outer portions of the toasting plate, the supporting flange D being, to this end, provided at its upper edge with a plurality of semi-circular recesses $d'$ which permit the deflected heat to pass outwardly to the portions of the toasting plate beyond the supporting plate. Thus, apertures or recesses $d'$ being immediately adjacent the toasting plate, the latter need not be limited in area to the area of the flange D, but may, as shown, have portions extending some distance beyond said flange and to which the heat is directed through the said apertures or recesses.

I claim:

1. The combination of a toasting plate, a supporting flange secured to the lower surface of the toasting plate and beyond which the edges of the toasting plate extend some distance, said flange being provided with a plurality of apertures extending therearound immediately adjacent the lower surfaces of the toasting plate, and a deflector comprising a cone secured to the lower surface of the toasting plate centrally within the supporting flange with its apex depending.

2. A toaster comprising a flat rectangular toasting plate, a supporting flange having outwardly bent lugs at its upper edge secured to the lower surface of the toasting plate a distance from the edges of the latter and provided in said upper edge with a plurality of recesses between the lugs, forming heat escape openings immediately adjacent to the lower surface of the toasting plate, and a cone secured upon the lower surface of the toasting plate within the flange, all substantially as and for the purpose set forth.

GUY H. CARLTON.

Witnesses:
   G. A. HEALD,
   F. A. COOK.

Copies of this patent may be obtained for five cents each, by addressing the "Commissioner of Patents, Washington, D. C."